United States Patent [19]
Billiet et al.

[11] Patent Number: 4,668,256
[45] Date of Patent: May 26, 1987

[54] LIQUID/GAS SEPARATION

[75] Inventors: Colin T. Billiet, Durham; Robert M. Fielding, Blyth; Leslie B. Spark, Andover, all of England

[73] Assignee: Domnick Hunter Filters Limited, Co. Durham, England

[21] Appl. No.: 801,053

[22] Filed: Nov. 22, 1985

[30] Foreign Application Priority Data

Nov. 23, 1984 [GB] United Kingdom ............... 8429640
Jun. 11, 1985 [GB] United Kingdom ............... 8515173

[51] Int. Cl.$^4$ ............................................. B01D 39/20
[52] U.S. Cl. ...................................... 55/219; 55/337; 55/345; 55/398; 55/458
[58] Field of Search ............... 55/165, 215, 216, 218, 55/219, 337, 345, 398, 458

[56] References Cited

U.S. PATENT DOCUMENTS

| | | | |
|---|---|---|---|
| 3,093,467 | 6/1963 | McLaughlin | 55/337 X |
| 3,378,993 | 4/1968 | Veres et al. | 55/219 |
| 3,418,789 | 12/1968 | Hoffman et al. | 55/219 |
| 3,980,457 | 9/1976 | Smith | 55/219 |
| 4,409,005 | 10/1983 | McKendrick | 55/218 X |

OTHER PUBLICATIONS

Dyna-Quip, "Filters-Regulators-Lubricators", a Div. of Stile-Craft Manufacturers, Inc.

Primary Examiner—Charles Hart
Attorney, Agent, or Firm—Henry Sternberg; Bert Lewen

[57] ABSTRACT

Apparatus for removing entrained liquid from a gas stream comprises a cylindrical casing (67) designed to be mounted so that its axis is substantially vertical. An inlet port (62) and a gas outlet port (63) are provided adjacent to the upper end of the casing and drain means (80) are provided at the lower end of the casing whereby separated liquid may be drained therefrom. A gas outlet tube (75) coaxial with the inner surface of the casing, extends downwardly from the upper end thereof, the outlet tube communicating at its upper end with the gas outlet port (63). A plurality of baffles (72) are arranged in an annulus around the outer surface of the outlet tube (75), the baffles being located downstream of the inlet port (62) and shaped to impart a spinning movement to the incoming gas stream. An impingement plate (77) is located downstream of the baffles and has an upper surface extending transversely across the path of the air stream leaving the baffles. The lower end of the gas outlet tube (75) lies below the level of the impingement plate and above the level of the drain means.

14 Claims, 4 Drawing Figures

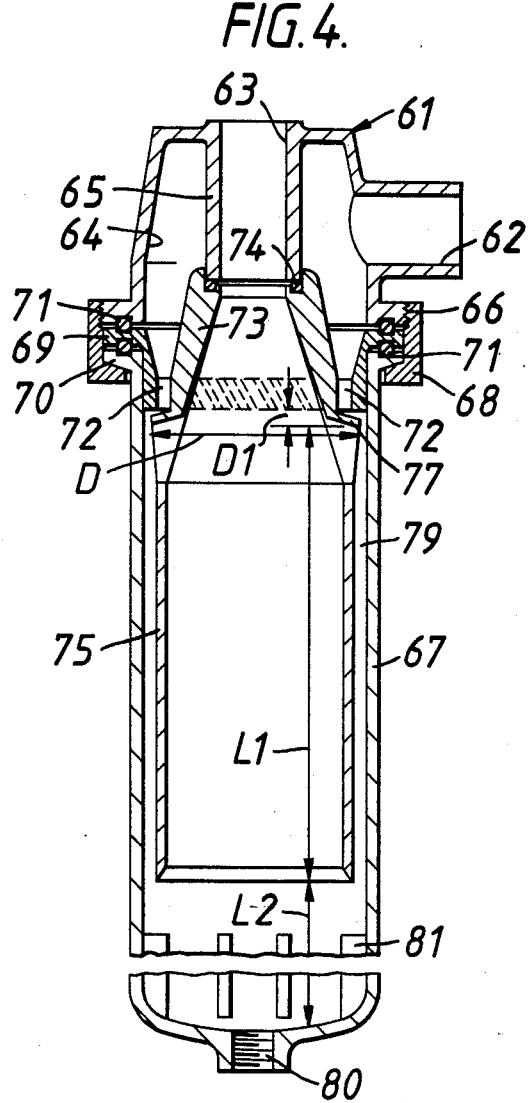

LIQUID/GAS SEPARATION

This invention relates to apparatus for removing entrained liquid from a gas stream.

A number of devices are available which are designed to separate water or other liquid from a stream of air or other gas. In the particular field of separating water from air there is a requirement to remove both entrained water droplets and aerosols over a wide range of flow rates and at high contamination levels of liquid water. For example, cyclonic separators may be used efficiently where water particles predominantly larger than 10 microns in diameter are to be removed, and in such case high efficiencies may be obtained at a reasonable pressure drop. Another type of separator that is reasonably efficient at large water particle diameters is impingement separators, which rely on physical obstructions diverting the flow of air such that liquid particles are caused to follow a different flow path from the air.

Neither cyclonic nor impingement separators are efficient when water droplets and aerosols over a wide range of particle diameters are to be removed.

Additionally, using the conventional techniques outlined above, there are difficulties in dealing with flows of gas that have a high entrained liquid loading in the form of a mist, spray or foam, as encountered, for example, in process gas scrubbing and process exhaust gas cleaning, and in high foam situations that occur, for example, in the fermentation industry. When the amount of generated and entrained liquid becomes excessive it must escape from the process equipment, and the requirement is that the high volume of liquid should be separated from the gas, with the gas being exhausted to atmosphere or further processed and the liquid being either drained or returned to the process equipment.

The invention seeks to provide separators that can be designed both to effect efficient separation over a wide range of particle diameters and to effect efficient separation at high liquid loading levels.

According to a first aspect of the invention apparatus for removing entrained liquid from a gas stream comprises a casing having a substantially circular-cylindrical inner surface and designed to be mounted so that the cylindrical axis is substantially vertical, an inlet port into the casing adjacent to the upper end thereof, a gas outlet port from the casing adjacent to the upper end thereof, drain means at the lower end of the casing whereby separated liquid may be drained therefrom, a gas outlet tube disposed substantially vertically within the casing substantially coaxial with the inner surface of the casing and extending downwardly from the upper end thereof, the outlet tube communicating at its upper end with the gas outlet port, a plurality of baffles arranged in an annulus around the outer surface of the outlet tube, the baffles being located downstream of the inlet port and shaped to impart a spinning movement to the incoming gas stream, and an impingement plate located downstream of the baffles and having an upper surface extending transversely across the path of the air stream leaving the baffles, the lower end of the gas outlet tube lying below the level of the impingement plate and above the level of the drain means.

Such apparatus combines the effects of cyclonic and impingement separators. The baffles act as an initial surface and impart a cyclonic movement to the incoming gas. As the spinning gas flow contacts the impingement plate liquid is thrown by centrifugal action and by impingement against the plate onto the inner surface of the casing. The projection of the lower end of the outlet tube below the impingement plate forces the gas to flow downwardly from the impingement plate before it is enabled to reverse direction. When such reversal occurs a very high proportion of the liquid continues to move downwardly towards the drain means, while gas flows upwardly to pass through the outlet tube to the outlet port.

It has been found that apparatus as aforesaid may be designed as will be explained more fully hereinafter so that it can effect separation of well over 99% of the entrained liquid even in conditions where the liquid/gas ratio is in excess of 150% weight/weight.

Preferably the upper surface of the impingement plate is substantially frusto-conical and is downwardly and outwardly inclined at an angle of from 10° to 30° to the horizontal. The preferred angle may be from 12° to 20°. Desirably the outer circumferential edge of the impingement plate is spaced below the lowermost parts of the baffles by a vertical distance of no more than 20 mm. The distance is more preferably in the range of from 1 to 6 mm.

Both the angle of the impingement plate and its vertical distance below the baffles are best determined empirically for particular applications of the separation apparatus, but the figures given above are a reasonable guide to the ranges in which to work. The objective is to provide a relatively smooth spinning flow onto the inner surface of the casing without a large pressure drop as the flow moves onto and past the impingement plate.

Preferably the lower end of the outlet tube is located below the outer circumferential edge of the impingement plate by a vertical distance greater than the vertical distance between said edge and the lowermost parts of the baffle.

Again, optimum distances can be determined empirically but it is desirable that the gas be forced to flow downwardly for a significant distance below the impingement plate. Particularly in the handling of high liquid loadings it is desirable that the vertical distance from the lowermost parts of the baffles to the lower end of the outlet tube is not less than the vertical distance from the lower end of the outlet tube to the drain means. If this relationship is not present then there is a danger of separated liquid in the bottom of the casing forming into a cone and being sucked upwardly and reentrained by the air flow moving up the outlet tube.

It is preferred that the baffles are disposed so that there is no unobstructed vertically extending pathway from the uppermost to the lowermost parts of the baffles. This ensures that the whole of the incoming fluid is positively subjected to spinning action without the possibility of any such fluid leaking past the baffles in a direct vertical flow path. Each baffle may conveniently be in the form of a plate mounted at an angle of approximately 45° to the plane transverse to the cylindrical axis. This angle may of course be changed, and indeed it is possible to use baffles having the form of a turbine blade.

Preferably the annular gap formed between the outer circumferential edge of the impingement plate and the inner surface of the housing is less than the annular gap formed between the outer surface of the outlet tube and the inner surface of the housing downstream of the impingement plate.

In this way a pressure drop is induced as the flow leaves the impingement plate, and this helps to generate laminar flow around the inner surface of the casing, the laminar flow assisting and maintaining the separation of the liquid from the gas. In order to preserve such laminar flow it is preferred that the inner surface of the casing be smooth, and it is also desirable that the surface be of a material relative to which the separated liquid has a high contact angle. Again, this will assist in maintaining separation.

Particularly in applications where high liquid loadings are expected it is preferred that below the lower end of the outlet tube the housing carries plates disposed transverse to the inner surface of the housing in order to inhibit cyclonic flow below the outlet tube.

If such plates are not present then the usual flow pattern at the lower end of the outlet tube will be that the gas changes its direction of spinning and forms a reverse cyclone that moves upwardly within the outlet tube. Particularly where high volumes of separated liquid are being handled the creation of such a reverse cyclone is unwanted as there would be a tendency for the gas of the reverse cyclone to entrain separated liquid within the lower part of the casing.

Conveniently a filter may be located between the inlet port and the baffles. The particular filter arrangement may take any one of a number of forms. At a minimum level it may be designed to remove solid particulate contamination from the incoming gas flow in order to prevent such solids being deposited with the separated liquid and causing the drain means to become obstructed. In other applications the filter may be a depth filter using a suitable coalescing medium capable of coalescing entrained liquid from the gas stream. The larger coalesced droplets are more readily separated by the cyclonic and impingement action and separation efficiency may thus be even further increased.

The combination of coalescence and impingement separation is another aspect of the invention, in accordance with which apparatus for removing entrained liquid from a gas stream comprises a casing, having an inlet port and a gas outlet port, a housing having nonporous walls and supported within the casing, inlet means for directing an incoming gas stream from the inlet port into the housing, the housing containing a coalescing medium capable of coalescing entrained liquid from the gas stream and the housing being shaped and disposed so as to direct incoming gas substantially vertically downwardly through the coalescing medium, deflector means at the lower end of the housing for significantly changing the direction of gas flowing out of the housing to cause separation of the gas and the coalescing liquid, outlet means for directing gas to the outlet port and drain means whereby separated liquid may be drained from the casing.

In use, as a liquid-laden gas flow passes through the coalescing medium liquid aerosol contained in the flow coalesces and forms larger droplets. These droplets, together with large droplets initially present in the gas flow are carried downwardly through the coalescing medium by the air flow, the downward movement also being assisted by gravity. In the lowermost part of the housing, therefore, the mean liquid particle diameter is significantly higher than at the upper, inlet part of the housing. As gas flows from the lower part of the housing, both the gas and the relatively large particles carried thereby impact on the deflector means, which acts as an impingement separator causing separation of the gas flow and liquid flow. The gas and liquid then pass to their respective outlets.

In one embodiment the casing is circular in cross-section, the housing is annular in cross-section and coaxial with the casing, the outlet means comprises an outlet tube coaxial with the housing and extending from below the lower end of the housing through the housing to an outlet port positioned above the housing, and the deflector means comprises a plurality of radially disposed baffles located and shaped to impart to the gas a spinning movement around the projected axial centre line of the housing so that air leaving the baffles forms an outer, downwardly moving cyclone and an inner upwardly moving reverse cyclone passing into the tubular passageway. Alternatively, the reverse cyclone may be inhibited by suitably positioned plates in the lower part of the casing.

In either embodiment the result of impingement on the baffles is to form a downwardly moving cyclone of air, from which the coalesced liquid is thrown by centrifugal action. The liquid impinges on the inner wall of the casing and drains down that wall to an outlet. Imparting a spinning movement to the air immediately it leaves the housing also prevents re-atomisation of the emerging coalesced liquid so ensuring that the liquid particles entering the cyclonic air stream are sufficiently large to be effectively separated.

In alternative embodiments of the invention the deflector means may simply be one or more impingement plates which act as an impingement separator but do not generate cyclonic movement of the air. These, however, will generally have a lesser efficiency.

In order that the invention may be better understood, specific embodiments of apparatus in accordance therewith will now be described in more detail, by way of example only, with reference to the accompanying drawings in which:-

FIG. 4 is a longitudinal cross-section through a fourth embodiment of apparatus;

Figure 1:
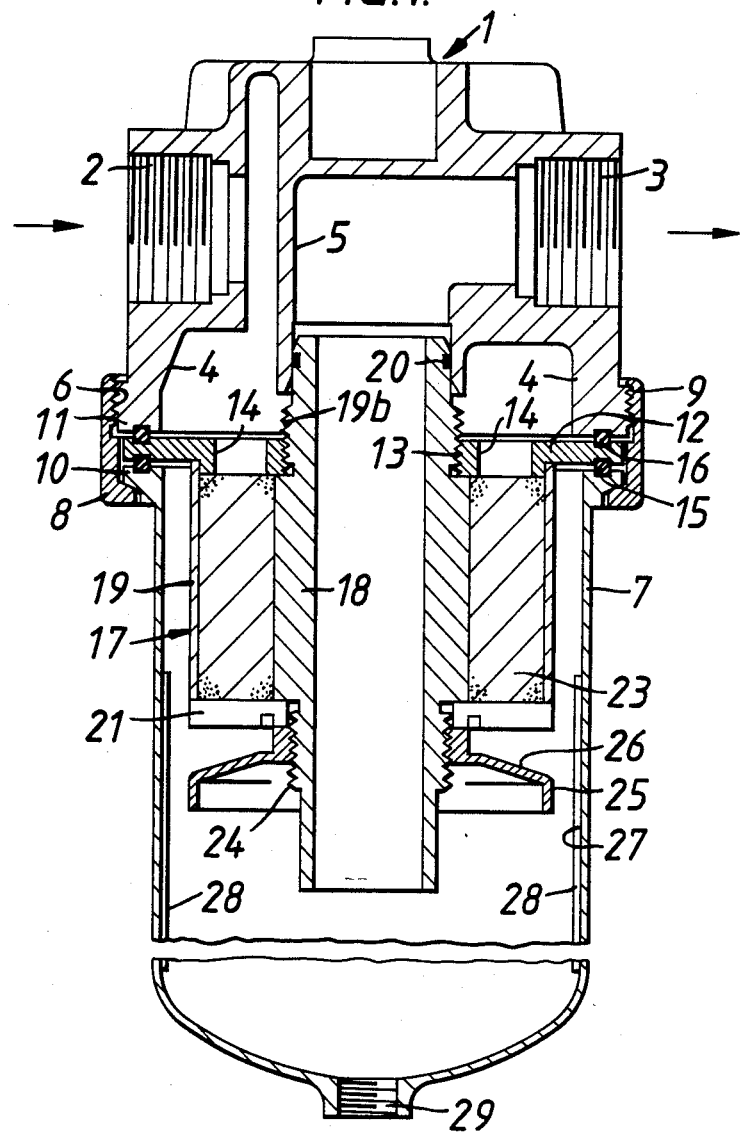
FIG. 1 is a longitudinal cross-section through a first embodiment of apparatus.

FIG. 1 shows a unit suitable for separating liquid droplets and aerosols from a gas stream. The unit includes a head 1 shaped to provide a gas inlet port 2 and a gas outlet port 3. The inlet port opens into an annular chamber 4 within the head, while the outlet port opens from a central chamber 5 within the head. The lower part of the head is formed with an external threaded section 6. A circular-cylindrical casing 7 is secured to the head 1 by a retaining ring 8 having an internally threaded section 9 mating with the threaded section 6. Sandwiched between a top flange 10 of the casing 7 and a bottom flange 11 of the cap is a plate 12 having a threaded central opening 13 and formed with a series of transverse ports 14. O-rings 15 and 16 effect a seal between the plate 12 and the casing and cap respectively.

Within the casing 7 there is located a housing shown generally as 17. The housing is annular in cross-section and is defined between the outer surface of a central gas outlet tube 18 and the inner surface of a circular cylindrical impervious wall 19. Both the tube 18 and the wall 19 are coaxial with the casing 7. An upper part of the tube 18 has an externally threaded section 19b engaged with the threads 13 on plate 14, and above the section 19b the tube 18 is formed with an annular groove accommodating a sealing ring 20 effecting a seal between the upper part of the tube and between the inner wall of the central chamber 5 of the cap. The base of the housing 17 is defined by a plurality of radially disposed baffles 21 each making an angle of approximately 45° with a plane at right angles to the axis of the unit, and each having upper and lower rounded edges. Each adjacent pair of baffles defines therebetween a gas outlet passage. Packed into the housing is a suitable coalescing medium 23.

A lower region of the tube 18 is formed with an externally threaded section 24 onto which is threaded an impingement plate 25 having a frusto-conical impingement surface 26 that is angled downwrdly and outwardly towards the inner wall 27 of the casing, desirably at an angle of about 15° to the horizontal. The inner surface of the casing is formed with a series of vertically extending ribs 28 spaced apart around the casing circumference. The impingement plate is desirably not more than 5 cm below the baffles 21, and lies significantly above the lower end of the tube 18.

The materials from which the unit is constructed may be corrosion-resistant, for example stainless steel or suitable polymeric materials. Alternatively, less expensive materials conducive to a corrosion-resistant treatment may be used. If the unit is destined for use in applications where sterility must be maintained then the materials and construction should be such as to enable a steam sterilisation cycle or solution sterilisation to be carried out at periodic intervals.

The coalescing material 23 will generally be a fairly open material allowing quick drainage and easy passage of the gas flow through the material in order to reduce pressure drop. The material will suitably be a fibrous assembly of such materials as manmade fibres, e.g. polyester or nylon, stainless steel wool or borosilicate glass.

In operation a stream of gas to be filtered is introduced by way of the inlet port 2 and passes into the annular chamber 4. From there the gas passes through ports 14 and travels downwardly through the coalescing material 23, the ports 14 being arranged so that the gas flow is substantially evenly dispersed across the available surface area of the coalescing medium. As the gas travels through this medium, coalescence of the liquid carried by the gas takes place by way of direct interception, inertial impaction and diffusion of liquid aerosol content on the fibrous medium. The coalesced droplets gravitate to the base of the housing 17, assisted by the gas flow. The coalescing action causes a substantial increase of the liquid mean particle diameter with respect to the corresponding diameter in the inlet flow.

As the liquid droplets leave the bottom of the housing they come into contact with the baffles 21 and are reentrained into the gas emerging from the housing 17. The baffles impart a spinning movement to the gas, causing it to form a downwardly moving cyclone. The mechanism is such that the liquid droplets are not re-atomised, but remain in the gas stream as relatively large droplets. The spinning gas flow, with the droplets entrained therein impacts on the impingement surface 26 of the impingement plate 25 positioned downstream from the baffles 21. The impingement surface 26 is downwardly and outwardly angled towards the inner wall of the chamber 7 and liquid impinging on the surface 26 is thus thrown onto the inner surface of the casing, where it tends to be collected. The gas stream, with liquid now substantially removed therefrom, continues downwardly within the casing in cyclonic form for some distance, and then reverses at high velocity to form an inner, upwardly travelling cyclone which enters the interior of tube 18 and is conducted by the tube to the outlet port 3. The liquid collected on the inner surface of the casing drains downwardly, assisted by the air direction and also by the presence of the ribs 28. the liquid collects at the base of the casing 7 and may be drained therefrom through a drain outlet 29 by any suitable automatic or manually assisted drainage system. The length of the casing 7 is such that the cyclonic air flow reverses direction and commences its upward travel before it comes into contact with the upper surface of liquid collected in the bottom of the casing.

It will be seen, therefore, that separation is effected by an initial coalescing stage, and then by both cyclonic and impingement separation of the coalesced droplets from the gas stream. In addition, any solid particulate which may be present in the gas flow is effectively separated and held by the coalescing medium 23, so preventing the possibility of the liquid drain being blocked by solid particles. It will be appreciated that the construction is such that the coalescing medium may be replaced as required.

Figure 2:
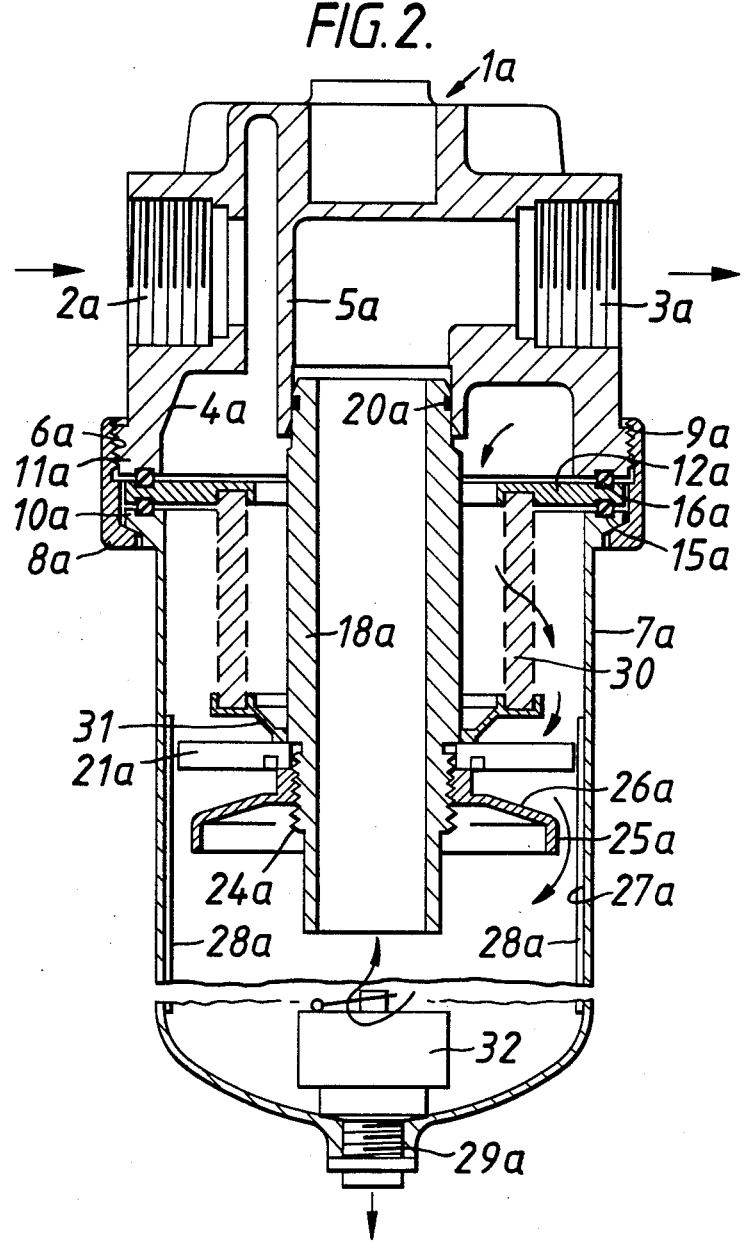
FIG. 2 is a longitudinal cross-section through a second embodiment of apparatus.

The use of a long bed of coalescing medium may, for some applications, lead to an unacceptably high pressure drop and a modified filter that will avoid this is shown in FIG. 2 of the drawings. Parts therein that are identical to those of FIG. 1 are shown by the same reference numerals with the suffix a. In this embodiment the housing containing the coalescing medium is substituted by a replaceable filter 30 suitably supported by the plate 12a and a mount 31 projecting from the tube. The filter may be of any suitable wrapped or pleated construction, and the filter medium may be of such materials as glass fibre, metal mesh or a fibrous polymer such as polyester, nylon or polypropylene. A suitable micron rating for the filter is from 5 to 100 microns. Operation is similar to that described for the FIG. 1 embodiment, gas entering the unit passing radially from inside to outside of the filter 30 before being caused to spin by the baffles 21a. The filter will not effect the same degree of coalescence as will that of the FIG. 1 embodiment, but solid particulate material will be removed so that the drain outlet 29a will not be obstructed thereby. The drain outlet has an automatic drain assembly 32 of any suitable construction. In a modified embodiment the filter and its mounting may be changed so that flow through the filter is from outside to inside.

Figure 3:
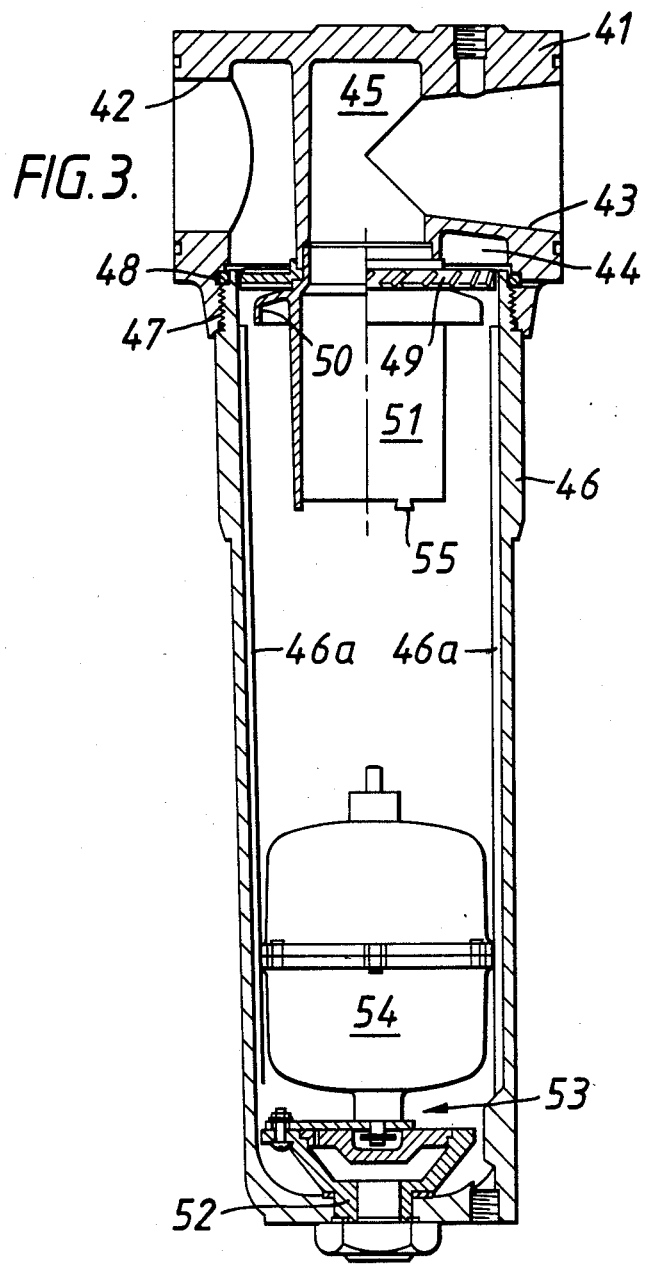
FIG. 3 is a longitudinal cross-section through a third embodiment of apparatus.

FIG. 3 shows a unit where there is no pre-filtration of the incoming gas flow. The unit comprises a head 41 shaped to provide a gas inlet port 42 and a gas outlet port 43. The inlet port opens into an annular chamber 44, while the outlet port opens from a central chamber 45. The casing 46, which has internal longitudinally extending ribs 46a, is secured by a threaded section 47 to a lower part of the head 45, being sealed therein by a sealing ring 48. A unit comprising a plurality of radially disposed baffles 49, a frusto-conical impingement plate 50 and a gas outlet tube 51 is suitably mounted on the head 41. The impingement plate 50 is mounted very close to the baffles 49, while the outlet tube 51 projects downwardly for a significant distance beyond the impingement plate 50. Drain of liquid from the casing 46 is by way of a drain port 52 under the automatic control of a discharge unit shown generally as 53 and including a float 54. Discharge units of this general type are well known. The lower end of the outlet tube 51 is formed with castellations 55, which prevent complete occlusion of the entry into the tube 51 if the float 54 should rise to its position of maximum height.

In operation, the incoming gas is spun to form a cyclone as it passes over the baffles 49, impinges on the impingement plate 50 and then forms a downwardly moving cyclone which reverses below the lower end of the outlet tube 51 to form an inner, upwardly moving cyclone that passes through the tube to the outlet port 43. Water separation from the gas stream is effected centrifugally as a result of the cyclonic action and also by impingement on the plate 50.

FIG. 4 shows a unit that is particularly suitable for use in separating high liquid loadings, e.g. in a process gas stream coming from, for example a fermentor, or other process equipment. The unit includes a head 61 shaped to provide an inlet port 62 for the incoming liquid gas mixture, and an outlet port 63 for separated gas. The inlet port opens into an annular chamber 64 within the head, while the outlet port opens from a central tubular section 65 of the head. The lower part of the head is formed with an externally threaded section 66 and a casing 67 is secured thereto by a retaining ring 68 engaging the threaded section 66. A support 69 is sandwiched between a top flange 70 of the casing and a bottom face of the head 61, and sealing rings 71 seal the interfaces in this region.

The support 69 has secured thereto the radially outer edges of a plurality of radially disposed baffles 72 each making an angle of approximately 45° with a plane at right angles to the axis of the unit, and each having profiles which optimise separation efficiency. The baffles are arranged so that there is no unobstructed vertically extending pathway from the uppermost to the lowermost parts of the baffles. Each adjacent pair of baffles defines therebetween an outlet passage for directing the gas with a spinning motion. The radially inner edges of the baffles are secured to a hollow carrier 73, the upper end of which lies adjacent to the lower end of the tubular section 65 and is sealed thereagainst by a sealing ring 74. The lower part of the carrier is extended downwardly to form an outlet tube 75 that is coaxial with the casing 67.

Below the baffles 72 the carrier 73 defines an impingement plate 77 of frusto-conical form extending radially outwardly and downwardly at an angle of about 15° to the horizontal. An annular passageway 78 is formed between the circumferentially outer edge of the impingement plate and the inner surface of the casing 67, and the outer surface of the outlet tube 75 tapers inwardly and downwardly for a short distance below the impingement plate before merging into a cylindrical section. An annular flow passage 79 is thus defined between the outer surface of the outlet tube 75 and the inner surface of the casing. The lower end of the casing 67 forms a drain 80 which may be closed or opened to release separated liquid. Above the drain 80 and radially disposed about the inner surface of the casing 7 are a number of vertically positioned baffle plates such as 81.

In operation, the liquid gas mixture, for example air and foam or air and oil, enters the apparatus through the inlet 62. The motion of the gas flow is controlled by chamber 64 ready for presentation to the baffles 72. The gas/liquid mixture leaving the baffles, partly separated by centrifugal action impacts on impingement plate 77 and gets thrown onto the internal wall of the casing 67. This has the effect of breaking foam if present and separating the liquid from the gas, the separated gas and liquid then flowing downwardly in the passage 79. At the upper part of the passage the flow is obviously turbulent, but the smooth surfaced annular passage of constant cross-section allows for laminar flow of the gas, while minimising turbulent reentrainment of the liquid. Flows of both materials are both axial down the passage and circumferentially around the wall of the passage, so that the liquid, being denser than the gas, is kept in contact with the inner surface of the casing, being the outer wall of the passage. When the flow reaches the lower end of the annular passage the cyclonic movement of the air is arrested by the baffle plates 81 and the air flows up within outlet tube 75 and passes to the outlet port 3. The inertia of the liquid and the effect of gravity cause the liquid to continue its passage in contact with the inner surface of the casing and with the baffle plates and thus flow to the bottom of the casing. It can then be taken to drain either on an intermittent or continuous basis, or indeed may be recycled into the process equipment or other vessels and equipment from which the foam or aerosol was generated.

In order to optimise the performance of the apparatus shown in FIG. 4 a number of factors have been found desirable. These include making the length of the outlet tube 75 from the impingement plate 77, distance L1 on FIG. 4, no less than the length of the casing below the lower end of the outlet tube, distance L2 on FIG. 4; making the angle of the impingement plate to the horizontal about 15° making the vertical distance D1 between the lower end of the baffles 72 and the outer circumferential edge of the impingement plate from 1 to 6 mm, making the length L1 greater than the diameter D of the outer circumferential edge of the impingement plate; and making the width of the annular passage 79 greater than the width of the annular passage 78, desirably from 1.25 to 1.75 times greater. Additionally it is preferable to ensure that the outer surface of the outlet tube 75 and the inner surface of the casing 67 are smooth in order to minimise the turbulence caused thereby, and also that the inner surface of the casing 67 is of a material to which the liquid being separated exhibits a high contact angle.

With optimum design, test results indicate excellent liquid/gas separation, very close indeed to 100%, even at high liquid throughputs. Thus, liquid loadings of 150% weight/weight liquid/gas may be handled at flow velocities of about 12 m/sec, while lower liquid loadings may be handled with similar efficiency at high flow velocities.

Units in accordance with the invention may be manufactured in a range of different dimensions designed to cope with different flow rates. For high volume applications a separator may be manufactured as a multiple unit filter, comprising a header unit on which are mounted a number of the separation units described. The header unit will distribute the air flow between the individual units, and this allows larger flows to be handled without the need for large, cumbersome separators.

It will be understood that numerous changes may be made to the detailed construction of the units as particularly described.

1. Apparatus for removing entrained liquid from a gas stream, the apparatus comprising a casing having a substantially circular-cylindrical inner surface and designed to be mounted so that the cylindrical axis is substantially vertical, an inlet port into the casing adjacent to the upper end thereof, a gas outlet port from the casing adjacent to the upper end thereof, drain means at the lower end of the casing whereby separate liquid may be drained therefrom, a gas outlet tube disposed substantially vertically within the casing substantially coaxial with the inner surface of the casing and extending downwardly from the upper end thereof, the outlet tube communicating at its upper end with the gas outlet port, a plurality of baffeles arranged in an annulus around the outer surface of the outlet tube, the baffles being located downstream of the inlet port and shaped to impart a spinning movement to the incoming gas stream, and an impingement plate located downstream of the baffles and having an upper surface extending transversely across the path of the gas stream leaving the baffles and disposed to direct the gas stream onto the inner surface of the casing, the lower end of the gas outlet tube lying below the level of the impingement plate and above the level of the drain means.

2. Apparatus according to claim 1 in which the upper surface of the impingement plate is substantially frusto-conical and is downwardly and outwardly inclined at an angle of from 10° to 30° to the horizontal.

3. Apparatus according to claim 1 in which the outer circumferential edge of the impingement plate is spaced below the lowermost parts of the baffles by a vertical distance of no more than 20° mm.

4. Apparatus according to claim 3 in which the outer circumferential edge of the impingement plate is spaced below the lowermost parts of the baffles by a vertical distance of from 1° to 6° mm.

5. Apparatus according to claim 1 in which the lower end of the outlet tube is located below the outer circumferential edge of the impingement plate by a vertical distance greater than the vertical distance between said edge and the lowermost parts of the baffles.

6. Apparatus according to claim 1 in which the vertical distance from the lowermost parts of the baffles to the lower end of the outlet tube is not less than the vertical distance from the lower end of the outlet tube to the drain means.

7. Apparatus according to claim 1 in which the baffles are disposed so that there is no unobstructed vertically extending pathway from the uppermost to the lowermost parts of the baffles.

8. Apparatus according to claim 1 in which each baffle is in the form of a plate mounted at an angle of approximately 45° to a plane transverse to the cylindrical axis.

9. Apparatus according to claim 1 in which the annular gap formed between the outer circumferential edge of the impingement plate and the inner surface of the housing is less than the annular gap formed between the outer surface of the outlet tube and the inner surface of the housing downstream of the impingement plate.

10. Apparatus according to claim 1 in which below the lower end of the outlet tube the housing carries plates disposed transverse to the inner surface of the housing in order to inhibit cyclonic flow below the outlet tube.

11. Apparatus according to claim 1 and including a filter located in the flow path from the inlet port to the baffles.

12. Apparatus according to claim 11 in which the filter is a coalescing filter.

13. Apparatus for removing entrained liquid from a gas stream, the apparatus comprising a casing, having an inlet port and a gas outlet port, a housing having nonporous walls and supported within the casing, inlet means for directing an incoming gas stream from the inlet port into the housing, the housing containing a coalescing medium capable of coalescing entrained liquid from the gas stream and the housing being shaped and disposed so as to direct incoming gas substantially vertically downwardly through the coalescing medium, deflector means at the lower end of the housing for significantly changing the direction of gas flowing out of the housing to cause separation of the gas and the coalescing liquid, outlet means for directing gas to the outlet port and drain means whereby separated liquid may be drained from the casing.

14. Apparatus according to claim 13 in which the casing is circular in cross-section, the housing is annular in cross-section and coaxial with the casing, the outlet means comprises an outlet tube coaxial with the housing and extending from below the lower end of the housing through the housing to an outlet port positioned above the housing, and the deflector means comprises a plurality of radially disposed baffles located and shaped to impart to the gas a spinning movement around the projected axial centre line of the housing, so that the air leaving the baffles forms an outer, downwardly moving cyclone and an inner upwardly moving reverse cyclone passing into the tubular passageway.

* * * * *

UNITED STATES PATENT AND TRADEMARK OFFICE
CERTIFICATE OF CORRECTION

PATENT NO. : 4,668,256

DATED : May 26, 1987

INVENTOR(S) : Billiet et al

It is certified that error appears in the above-identified patent and that said Letters Patent is hereby corrected as shown below:

In the claims:

Claim 1, column 9, line 8, "baffeles" should be --baffles--

Claim 3, column 9, line 26, change "20° mm" to --20 mm--

Claim 4, column 9, line 30, change "1° to 6° mm" to --1 to 6 mm--

Signed and Sealed this

Fifteenth Day of September, 1987

Attest:

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,668,256

DATED : May 26, 1987

INVENTOR(S) : COLIN T. BILLIET

It is certified that error appears in the above-identified patent and that said Letters Patent is hereby corrected as shown below:

Column 2, line 43, delete "not";

Column 8, line 26, delete "no";

Column 9, claim 6, line 40, delete "not."

Signed and Sealed this

Twelfth Day of June, 1990

Attest:

HARRY F. MANBECK, JR.

*Attesting Officer*

*Commissioner of Patents and Trademarks*